(12) United States Patent
Doane (10) Patent No.: US 6,960,750 B2
(45) Date of Patent: Nov. 1, 2005

(54) OPTICAL POSITIONING SYSTEM AND METHOD, TRANSCEIVER, AND REFLECTOR

(75) Inventor: Paul M. Doane, Baldwin, MO (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 10/338,454

(22) Filed: Jan. 8, 2003

(65) Prior Publication Data

US 2004/0129865 A1 Jul. 8, 2004

(51) Int. Cl.[7] ......................... G01C 21/02; G01C 21/24
(52) U.S. Cl. .................. 250/206.1; 250/216; 395/529; 244/135 A
(58) Field of Search ................................. 359/515, 529, 359/530, 727, 730, 834, 856–861, 534–537, 359/520, 549; 250/206.1, 221, 216; 385/18, 385/39, 52; 356/140–141.2, 152.1–152; 398/169–170; 244/135 R, 135 A, 161; 342/5, 7, 9, 11

(56) References Cited

U.S. PATENT DOCUMENTS

| | | | | |
|---|---|---|---|---|
| 4,025,193 A | * | 5/1977 | Pond et al. | 356/5.1 |
| 5,015,096 A | * | 5/1991 | Kowalski et al. | 356/613 |
| 5,326,052 A | | 7/1994 | Krispin et al. | |
| 5,530,650 A | * | 6/1996 | Biferno et al. | 701/300 |
| 5,647,559 A | * | 7/1997 | Romer et al. | 244/3.13 |
| 5,734,501 A | * | 3/1998 | Smith | 359/530 |
| 6,420,694 B1 | | 7/2002 | Greenwood | |

* cited by examiner

Primary Examiner—Stephone B. Allen
Assistant Examiner—Davienne Monbleau
(74) Attorney, Agent, or Firm—Alston & Bird LLP (57) ABSTRACT

An optical system and method for positioning a first object with respect to a second object, such as a refueling aircraft and an unmanned air vehicle are provided with the system, including a pattern of reflectors, an optical receiver, an optical transmitter, and a processor. The method and system permit processing two dimensional images of reflected signals and ranging of the reflector to the transmitter. An optical transceiver may also be used instead of a discrete receiver and transmitter. The reflector may include a pattern of peripheral retroreflectors and limit-angle incident retroreflectors that only reflect light incident upon the retroreflector within a predefined range of incident angles.

32 Claims, 9 Drawing Sheets

OPTICAL POSITIONING SYSTEM AND METHOD, TRANSCEIVER, AND REFLECTOR

FIELD OF THE INVENTION

The present inventions relate to optical reflectors, and reflective positioning systems and methods, and more particularly, a limit-angle incident retroreflector, an optical transceiver, and methods and systems for positioning objects using limit-angle incident retroreflectors and optical transceivers.

BACKGROUND OF THE INVENTION

The use of unmanned air vehicles (UAV) has been increasing in both commercial and military applications in recent years. As UAV technology progresses, it has become apparent that air-to-air refueling capabilities may be necessary for UAVs. Current methods and systems for air-to-air refueling of other types of aircraft have not been easily applied to UAVs due to the nature of pilot control generally required in air-to-air refueling operations.

There are currently two primary systems for air-to-air refueling. One system is the boom refueling system. The boom refueling system typically comprises a rigid boom extended from a refueling aircraft. At one end of the boom is a refueling nozzle and adjacent the refueling nozzle are airfoils, which are controlled by a boom operator on the refueling aircraft. The airfoils provide maneuverability of the boom with respect to an aircraft that is to be refueled. For the aircraft that is to be refueled, the receiving aircraft, the pilot typically maneuvers the aircraft to within a sphere of radius aft and below the refueling aircraft, the tanker aircraft. Upon maneuvering into the sphere of radius, the boom operator controls the airfoils to position and mate the boom into a refueling connection on the receiving aircraft. As UAVs do not have pilots to precisely maintain position relative to the tankers, air-to-air refueling using boom refueling systems has to date not been accomplished.

Another type of refueling system is the probe and drogue system. In the probe and drogue system, a refueling hose having a drogue disposed on one end is trailed behind the tanker. The receiving aircraft has a probe that is flown by its pilot into the drogue. As the drogue typically moves away from the receiving aircraft as it approaches, great skill and maneuvering ability is required by the pilot to mate the probe with the drogue. Again, as UAVs do not have pilots, UAV, air-to-air refueling using probe and drogue systems has not previously been accomplished.

Optical systems have been devised in the past for positioning refueling drogues with respect to refueling probes. As refueling drogues, however, have proven relatively unmaneuverable, these systems have not been operationally viable. One such optical system is described in U.S. Pat. No. 5,326,052 to Krispin et al. Other optical systems for positioning objects with respect to reflectors and retro-reflectors have not been easily adapted to air-to-air refueling systems. Therefore, it would be desirable to have an air-to-air refueling system that utilizes optical positioning methods to position an unmanned air vehicle with respect to a refueling aircraft for both a boom refueling system and a probe and drogue refueling system. It would also be desirable to have a system that could be easily integrated into existing flight control systems on board UAVs so that the existing flight control systems can be responsive to an optical signaling system for positioning the UAV.

BRIEF SUMMARY OF THE INVENTION

An optical system for positioning a first object with respect to a second object is presented herein. Generally, the first and second objects according to the described embodiments are the tanker (illustrative of the first object) and an unmanned air vehicle (illustrative of the second object), however, the invention is generally applicable to positioning other objects utilizing the system and methods described herein without departing from the spirit and scope of the present invention. The presented system includes a pattern of reflectors disposed on the tanker. The reflectors include peripheral retroreflectors and central limit-angle incident retroreflectors disposed in a predefined arrangement. The central limit-angle incident retroreflector reflects light for a smaller range of incident angle than the peripheral reflector. Thus, sensing which reflectors are reflecting light allows the UAV to determine its location relative to the tanker. The unmanned air vehicle includes an optical transmitter positioned for transmitting an optical signal toward the reflector, and an optical receiver adjacent to the transmitter to sense the reflected light from the peripheral and central reflectors. A processor on the UAV analyzes the signal from the receiver to determine the UAV's position relative to the tanker, thus permitting the UAV to position itself in the desired location relative to the tanker for refueling.

According to one aspect of the invention the central limit-angle incident retroreflector comprises a plurality of tube reflectors. A tube reflector comprises at least one corner reflector having at least one tube with a transparent bore and opaque sidewalls. The tube is disposed over at least one corner reflector such that light passing axially through the bore is incident upon and reflects from the corner reflector. Generally, the length and width of the tube define a first ratio that, in turn, defines the first limiting incident angle with respect to an axis of the bore. As such, light entering the bore at an angle greater than the first limiting incident angle is attenuated by the opaque sidewalls such that light does not reflect from the corner reflector.

According to this embodiment of a reflector, the ratio of the tube diameter to length defines a cone within which incident light is reflected from a corner reflector, and outside of which no reflection occurs as the light rays are attenuated by the opaque sidewalls. In this manner, the cone of reflection defines the relative location of the UAV to the tanker.

Another embodiment of an optical system intended for, but not limited to, drogue refueling comprises a first section of reflectors disposed on the drogue, and a second section of reflectors disposed on the UAV. An optical transmitter is disposed in a fixed relationship to the second section of reflectors for transmitting an optical signal toward the first and second sections of reflectors. An optical receiver is disposed in a fixed relationship to the UAV disposed reflectors and positioned to receive optical reflections from the reflectors mounted on the tanker. A processor is in communication with the optical transmitter and optical receiver and is adapted to compare a spatial separation of the first section of reflectors and second section of reflectors based on the optical signal reflected from first and second sections of reflectors. According to one aspect of this system the processor provides a position error signal based upon the spatial separation of the optical signal from the first section and the second section of reflectors. The position error signal can be provided to a flight control computer or the like on the UAV to effect positioning with respect to the drogue. One aspect of this embodiment is applicable to a probe and drogue type refueling system commonly found on refueling aircraft.

According to a probe and drogue embodiment, the reflectors are disposed on the drogue and refueling probe and, therefore, permit positioning of the unmanned air vehicle's refueling probe with respect to the drogue.

Another embodiment of the present invention relates to an optical transceiver that may advantageously be used in the systems described above. The transceiver combines the functions of the optical transmitter and receiver. The optical transceiver comprises a light emitter for transmitting an optical signal, such as a light emitting diode or a laser. A beam forming lens is disposed in the path of the optical signal transmitted from the light emitter. A focusing lens is disposed proximate to the beam forming lens and lens is positioned to focus the optical signal after having been reflected. An optical splitter, such as a half silvered mirror, is disposed along the focal axis of the focusing lens and at a distance less than the focal length for splitting the optical signal along the focal axis into first and second paths. The signal is split into two paths to provide one path to an imager, such as a charge coupled display. The other signal path may be provided to an optical ranging receiver, such as a photo diode.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
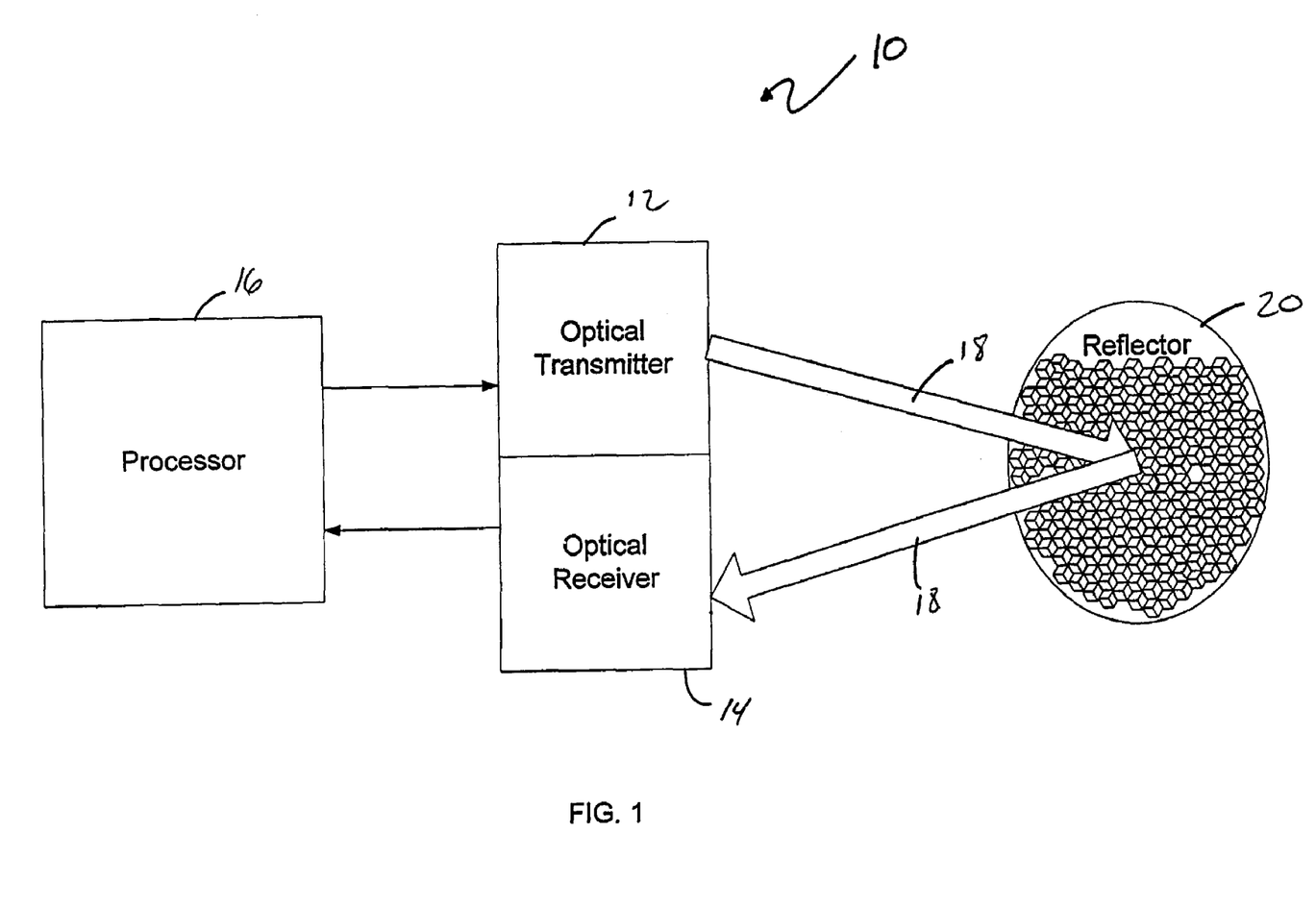
FIG. 1 is a block diagram of an optical system according to one embodiment of the present invention.

According to the present invention, an optical system including an optical transceiver and a reflector are provided. Referring now to FIG. 1, and somewhat generically illustrated, is an optical system 10 used to provide position error and guidance. A transmitter 12 typically provides an optical signal 18 to a reflector 20; an optical receiver 14 then receives the reflected optical signal 18. Various characteristics of the transmitted and reflected signals are then compared and analyzed by a processor 16, such as a computer, microprocessor, associated peripherals, and the like to provide an error signal or some other guidance, such as to a positioning system. The positioning system may be, for example, robotic systems, wheel drives, lever drives, machine control systems, or other systems that effect positional movement of an object with respect to the retroreflector. Reflectors, optical transceivers, and optical systems incorporating various aspects of the present invention, as described herein, are generically applicable to optical positioning systems and other systems that may incorporate the use of retroreflectors and optical sensors.

While generically applicable, the present invention is described in conjunction with air-to-air refueling systems and, more particularly, in conjunction with air-to-air refueling systems for UAVs. As UAVs do not easily facilitate manual control during refueling operations, an optical positioning system incorporating the optical transceiver and reflectors of the present invention, therefore, enable air-to-air refueling of UAVs. In this case, a computer in communication with the optical receiver and transmitter may provide an error signal or some other positional guidance to a flight control system to effect positional movement of the aircraft. However, one of ordinary skill in the art will recognize that the description in conjunction with an air to air refueling system is only one example of the present invention and many other optical positioning systems may advantageously implement the reflectors, optical transceivers, and optical systems described herein without departing from the spirit of scope of the present invention.

Figures 2A, 2B:
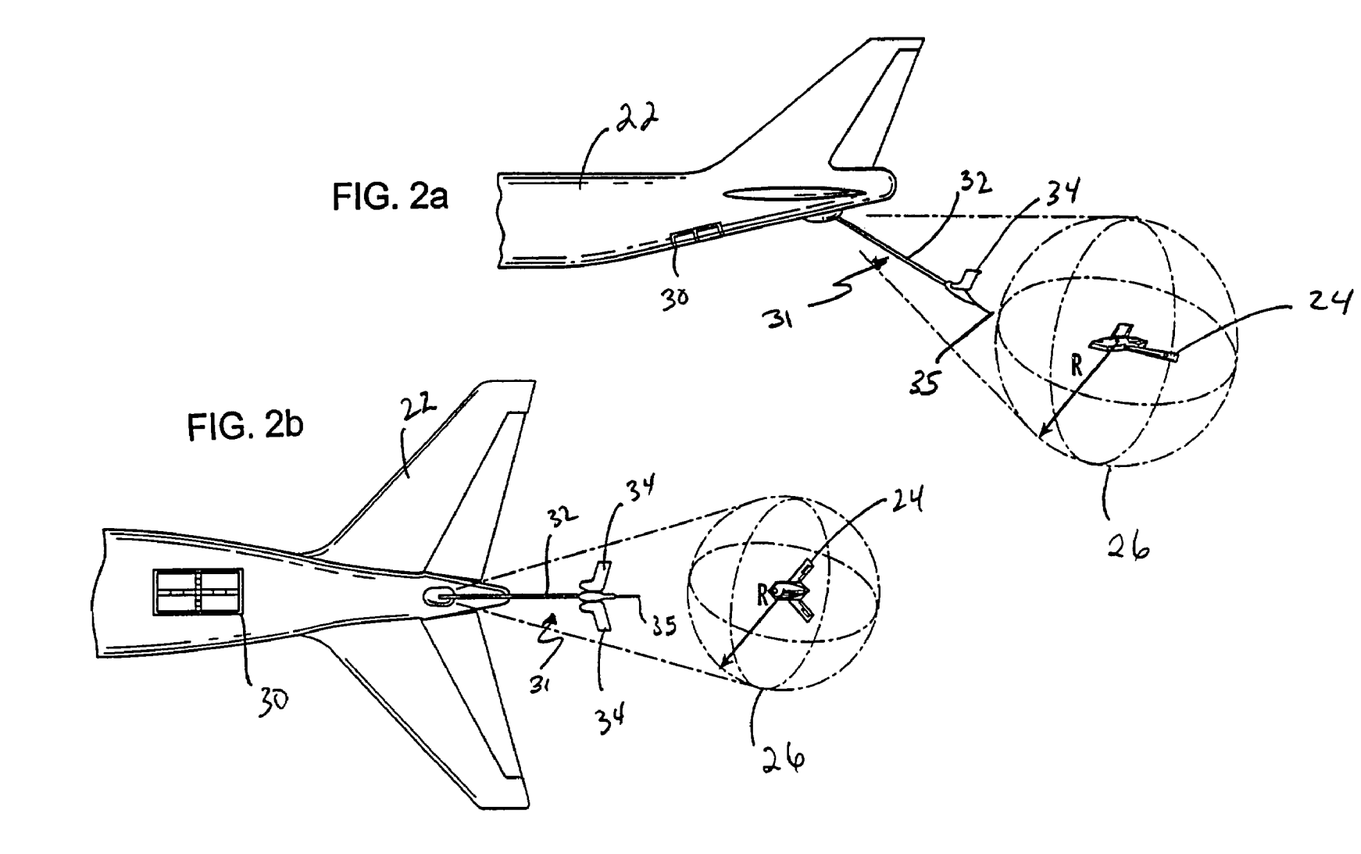
FIGS. 2a and 2b are side bottom views of an air to air refueling envelope for a boom refueling system including a retroreflector disposed on the refueling aircraft according to one embodiment of the present invention.

Referring now to FIG. 2, one example of an air-to-air refueling configuration is depicted. A reflector pattern 30 is disposed on a refueling aircraft 22, while a second aircraft, such as the unmanned air vehicle 24, maneuvers to position within a sphere 26 of radius, R, behind the refueling aircraft. In this configuration, a refueling boom is extended from the aft end of the refueling aircraft. A refueling boom 31 typically includes a longitudinal structural member 32, a controllable airfoil 34 for aerodynamic positioning, and refueling probe 35. The unmanned air vehicle 24 positions itself within the sphere 26 aft of the refueling aircraft 22. At that time a boom operator onboard the refueling aircraft maneuvers the boom 31 to mate with a refueling receptacle on the unmanned air vehicle 24.

Figure 3:
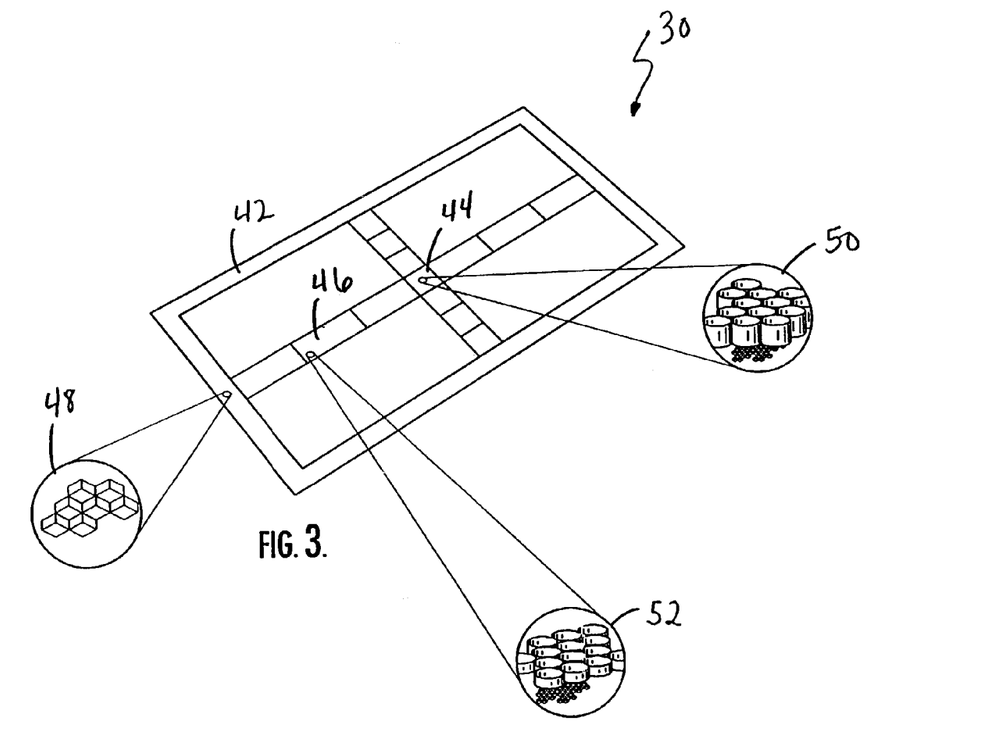
FIG. 3 is a perspective view of a retroreflector according to one embodiment of the present invention.
Figures 4, 5A:
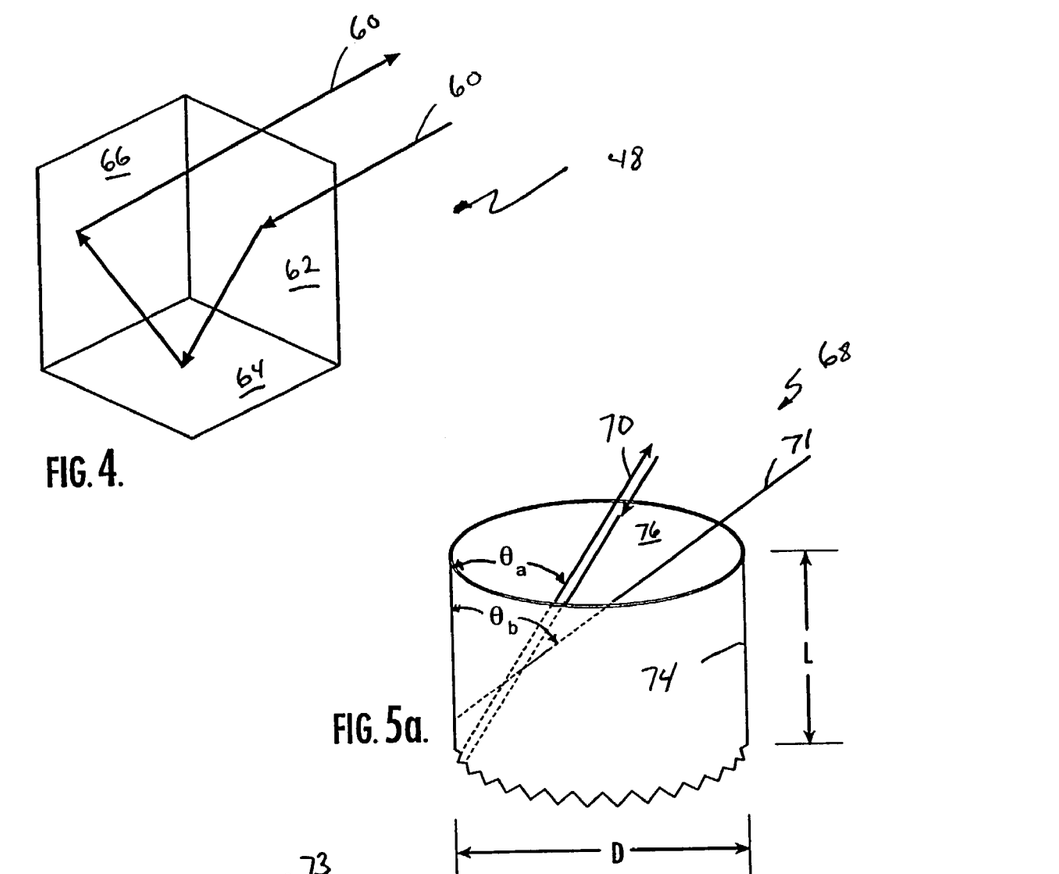
FIG. 4 depicts a cube reflector as used in a peripheral reflector according to one embodiment of the present invention.
FIGS. 5a and 5b depict limit-angle incident tube reflectors illustrating non-limiting rays and limiting rays according to one embodiment of the present invention.

In order for the unmanned air vehicle 24 to position itself within the refueling sphere 26, an optical system, such as described in FIG. 1, is provided to provide position error and guidance to the unmanned air vehicle 24. As illustrated in FIGS. 2a and 2b, a reflector 30 is disposed on the underside of the refueling aircraft 22. According to this embodiment, the reflector 30 includes a peripheral retroreflector 42, as shown in FIG. 3. The peripheral retroreflector 42 comprises a plurality of retroreflectors, which, in this embodiment, are corner reflectors 48. Corner reflectors are known to those of ordinary skill in the art. Referring now to FIG. 4, a corner reflector 48 typically comprises three reflective surfaces 62, 64, 66 orthogonal to one another whereby a ray of light 60 impinging on one reflective surface 62 is reflected to a second reflective surface 64, then to a third reflective surface 66, and then returns along substantially the same ray path as the original impending ray of light 60. These and other retroreflectors, that is reflectors that return light back to its original source along substantially the same path as an original ray of light, are well known to those of ordinary skill in the art and other retroreflectors may be substituted accordingly.

Figure 5B:
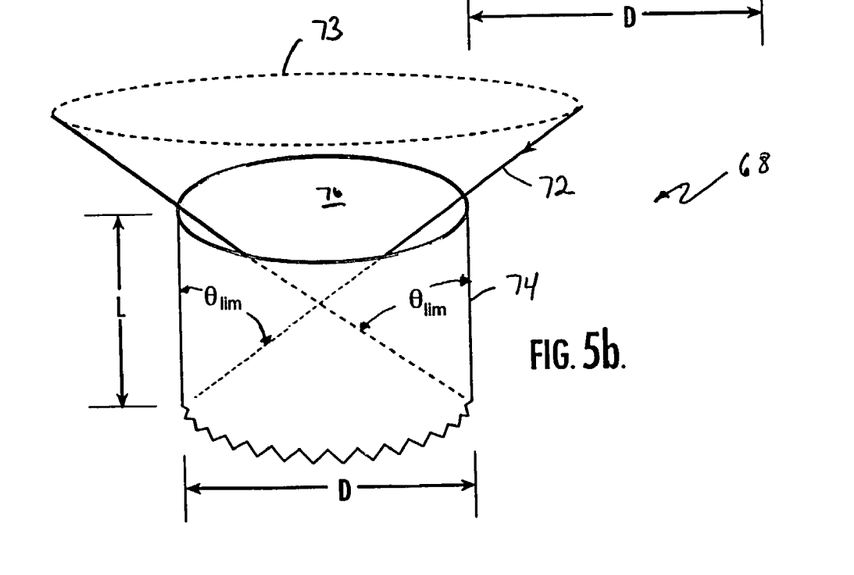

Returning now to FIG. 3, the reflector also comprises a plurality of limit-angle incident retroreflectors 50, 52, and in this embodiment, central limit-angle incident retroreflectors 44 and intermediate limit-angle incident retroreflectors 46. Limit-angle incident retroreflectors are retroreflectors that limit the reflection of light by preventing the reflection of light that is incident upon the retroreflector at an angle greater than a limiting incident angle. One advantageous embodiment of a limit-angle incident retroreflector is depicted in FIGS. 5a and 5b and more fully illustrates how a limit-angle incident retroreflector limits reflection of light. According to this embodiment, this limit-angle incident retroreflector is a tube reflector 68. A tube reflector 68 comprises one or more retroreflectors, such as corner reflectors 58 previously described, having a tube 74 axially disposed over the corner reflectors 58. According to this embodiment, the tube 74 has an opaque sidewall 76 that absorbs and attenuates incident light preventing further reflections from the retroreflector. As is demonstrated in FIG. 5a, a ray of incident light 70 is reflected only if it is incident upon the retroreflector at an angle less than the incident limiting angle. For example, the angle, $\theta_a$, illustrates the angle of the incident ray 70 with respect to the longitudinal axis 75 of the tube. In this case, the angle, $\theta_a$, is less than the incident limiting angle; the incident ray 71 is illustrated to have angle, $\theta_b$, which does not reflect on the corner reflector and therefore is not reflected to its source. The tube 74 defines a length, L, and diameter, D, comprising a transparent bore and opaque sidewalls 76 and is disposed over at least one corner reflector 58 such that light passing axially through the bore reflects on the corner reflector.

As illustrated, by example in FIG. 5b, the length, L, and diameter, D, of the tube 74 may be adjusted in order to effectively choose the incident limiting angle that is the angle above which incident light 72 does not reflect back to its source but is attenuated by the opaque sidewalls 76. As such, the limiting incident angle, $\theta_{lim}$, is selected according to the inverse tangent of the ratio of the diameter and length, $\theta_{lim} < \tan^{-1}(D/L)$. Therefore, a cone 73 having an interior angle of $\theta_{lim}$ is defined within which incident light 72 reflects back to its source, and outside of which incident light 72 is attenuated by the tube 74. While a cylindrical tube is described, it will be appreciated by one of ordinary skill in the art that tubes of other shapes may be substituted and include oval, ovoid, square, hexagonal, octagonal, and other polygonal shape cross sections of a tube comprising opaque sidewalls. Accordingly, the ratio of the lengths and widths of the polygonal shapes therefore determine the incident limiting angles similar to that described above with respect to the length and diameter of a cylindrical tube.

Returning now to FIG. 3, at least two sections of limit-angle incident retroreflectors are provided. The central and intermediate limit-angle incident retroreflectors 44, 46 according to this embodiment, comprise tube reflectors 50, 52 such as described in FIGS. 5a and b, having a transparent bore and opaque sidewalls 76 and defining a length, L, and diameter, D. In this example, the length, L, to diameter, D, ratio of the central limit-angle incident retroreflector 44 is greater than that of the intermediate limit-angle incident retroreflector 46, thereby defining a narrower cone which incident light will be reflected. Accordingly, the length of the tubes of the intermediate angle retroreflectors 46 are shorter than that of those of the central limit-angle incident retroreflectors 44, while having similar diameters, so that a greater range of incident angles may be reflected by the intermediate incident angle retroreflectors. Of course the length, L, and diameter, D, may be adjusted to achieve varying incident limiting angles in order to accommodate other positioning signals, such as described in more detail below.

The reflector described in FIG. 3, therefore, provides an advantageous optical signal device for an optical system such as described in FIG. 1. In this case, an optical transmitter 12 may transmit an optical signal 18 towards the reflector 30 and the return light from the reflector 30 will comprise light reflected from at least the peripheral retroreflector. If the optical transmitter 12 and receiver 14 are within the cone defined by the limiting angle, which therefore permits reflection, the transceiver will receive the optical signal reflected from the central limit-angle incident retroreflector 44.

Figure 6A:
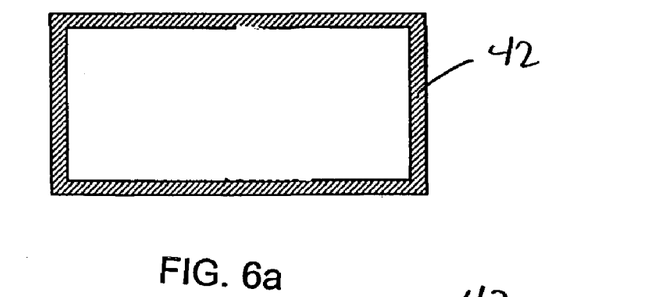
FIGS. 6a–d are plan views of illumination schemes of a retroreflector according to one embodiment of the present invention.
Figure 6B:
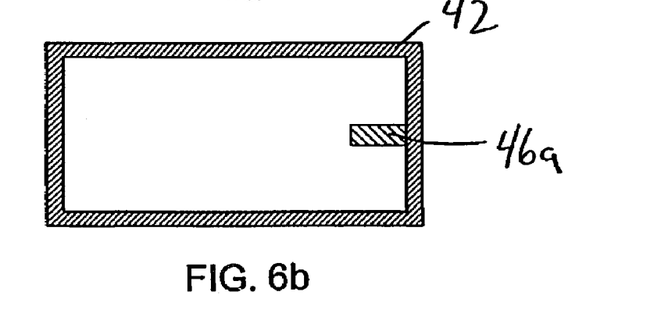
Figure 6C:
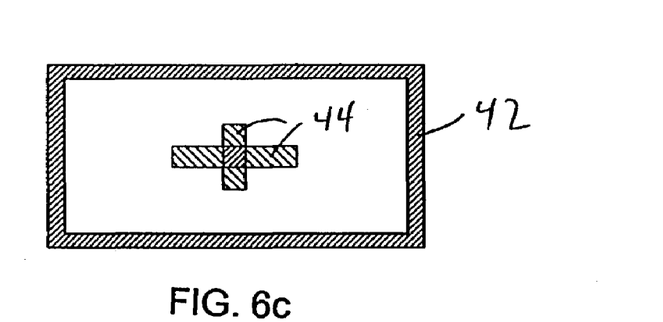

FIGS. 6a through 6d further illustrate this principle by demonstrating how the reflector 30 may be perceived by the optical receiver at various positions with respect to the refueling aircraft 22. For example, if the unmanned air vehicle 24 is outside the cone defined by the limiting incident angle of the intermediate incident limiting-angle retroreflectors 46, the optical receiver will only see reflections from the peripheral retroreflectors 42, FIG. 6a. As the aircraft positions to within the broader cone defined by one set of intermediate limit-angle incident retroreflectors 46, the optical receiver will then also see reflections from the intermediate limit-angle incident retroreflectors, as shown in FIG. 6b, wherein one intermediate limit-angle incident retroreflector is illuminated. As the aircraft continues to maneuver within the smaller cone defined by the central limit-angle incident retroreflector 44, the optical receiver will also detect reflections from the central limit-angle incident retroreflector 44.

As can now be explained referring back to FIGS. 1 and 2, it is advantageous to define the cone defined by the limiting angle of the central limit-angle incident retroreflectors to be coincident with the sphere 26 of radius, R, for the refueling envelope. That is to say when an optical receiver 14 sees reflections from the central limit-angle incident retroreflector 44, the processor 16, such as a computer, microprocessor, associated peripherals, and the like may then recognize that the unmanned air vehicle 24 is at least within a portion of a lateral refueling envelope relative to the refueling aircraft 22. When the unmanned air vehicle 24 is not within that refueling envelope, the optical receiver 14 may at least receive reflections from the peripheral retroreflectors 42 and, when within the cone defined by at least one intermediate limit-angle incident retroreflector 46, reflections from the intermediate limit-angle incident retroreflector 46. As such, intermediate limit-angle incident retroreflectors 46 may be placed in a variety of positions about the central limit-angle incident retroreflector in order to permit the processor 16 to determine a lateral position error signal or other lateral positioning signal to be provided to a flight control system or the like.

Figure 6D:
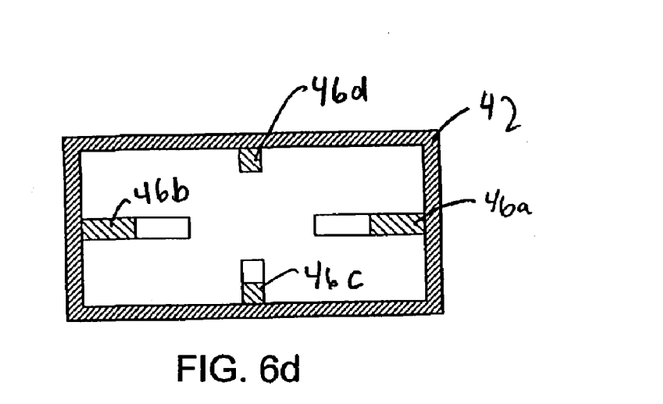

Therefore, positioning the unmanned air vehicle 24 to within the refueling envelope may be determined by the reflected signals. For example in FIG. 6b, only one intermediate limit-angle incident retroreflector 46*a* is shown illuminated and this may correspond to a signal requiring the unmanned air vehicle to move forward relative to the refueling aircraft in order to further maneuver to within the refueling envelope. As shown in FIG. 2, this reflector is the intermediate limit-angle incident retroreflector 46*a* that is toward the aft part of the refueling aircraft. Similarly, other intermediate limit-angle incident retroreflectors may be used to provide similar signals. For example, FIG. 6*d* illustrates how each intermediate limit-angle incident retroreflector might be set up for moving forward 46*a*, aft 46*b*, port 46*c*, or starboard 46*d* with respect to the refueling aircraft. As such, the retroreflectors provide signaling permitting control of the positioning to within the refueling envelope that has previously been defined by the central limit-angle incident retroreflector 44.

According to one embodiment, the optical transmitter 12 and optical receiver 14 may utilize optical ranging techniques in conjunction with the previously described reflector 30. For example, and as is known to those of ordinary skill in the art, pulse width modulation of optical signals may be analyzed by computer 16, a processor, or the like in determining the time delay from transmission of an optical signal 18 to the reception of the optical signal reflected from the reflector 30. As such, the time delay can be correlated to a range between the transmitter 12/receiver 14 and reflector 30 based on the speed of the transmitted signal. Accordingly, ranging calculations may be correlated to the position of the unmanned air vehicle 24 with respect to the sphere 26 defining the refueling envelope, as in FIG. 2. In combination, therefore, the reflector 30 defining cones corresponding to the refueling envelope within which incident light is reflected, and the range calculations to the reflector 30 both provide range error and positioning signals that may be provided to a flight control system, or other positioning system, in order to effectively and accurately position the unmanned air vehicle 24 in a range with respect to the refueling aircraft 22.

As a result, the above described reflector 30 and system 10 advantageously provide a method for positioning the first object relative to a second object; for example, positioning an unmanned air vehicle 24 relative to a refueling aircraft 22. The method comprises identifying a peripheral retroreflector 42 on a refueling aircraft 22 with an optical receiver 14 on the unmanned air vehicle 24. In order to identify the peripheral retroreflector 42, the optical transmitter 12 transmits an optical signal towards the peripheral retroreflector 42 and the optical receiver 14 images the reflected optical signal.

The next step comprises identifying at least one of the plurality of intermediate limit-angle incident retroreflectors 46 on a refueling aircraft 22 and associating the identification of that one of the plurality of intermediate limit-angle incident retroreflectors 46 with a lateral position. For example, referring back to FIG. 6*d*, intermediate angle limiting retroreflectors 46*a*–*d* may correspond to forward 46*a*, aft 46*b*, port 46*c*, or starboard 46*d* positions. The lateral position signal may then be provided to the flight control system of the unmanned air vehicle in order to maneuver based on the position or error signals associated with the illumination of a particular retroreflector.

As the unmanned air vehicle 24 continues to maneuver to within the refueling envelope, the central limit-angle incident retroreflector 44 is illuminated. The image corresponding to signals reflected from the central limit-angle incident retroreflector 44 may be associated with a lateral position signal indicating that the flight control system should laterally hold the unmanned air vehicle 24 within position, as the cone of the central limit-angle incident retroreflectors defines at least a portion of the refueling envelope.

Additionally, other embodiments of the method may also comprise transmitting a ranging signal from the optical transmitter 12 and receiving the reflection of the ranging signal from the reflector 30 and optical receiver 14 on the unmanned air vehicle 24. From the reflective signal, a time delay between the transmitted signal and the received signal may be associated with a range positioning signal and corresponding to positions with respect to the radius of the refueling envelope. The range positioning signal may then be provided to the flight control system of the aircraft in order to provide a range error signal or positioning signal that instructs the aircraft to close range or open range in order to remain within or at a position within the refueling envelope.

Figure 7:
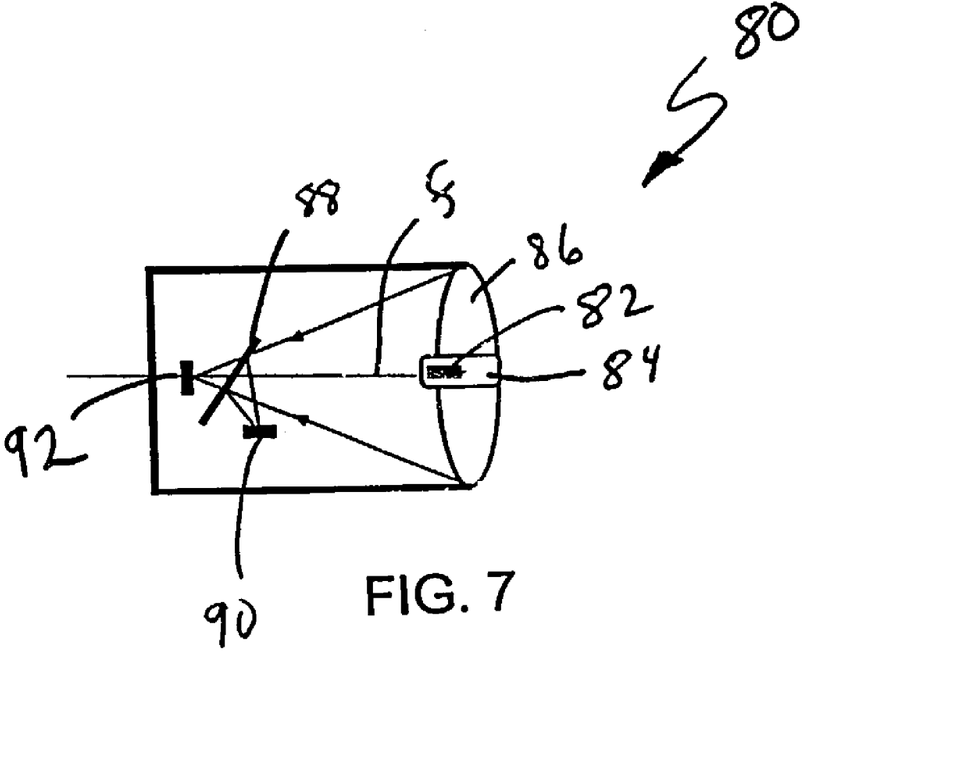
FIG. 7 is schematic view of an optical transceiver according to one embodiment of the present invention.

One advantageous embodiment of an optical system including an optical transmitter and receiver is more thoroughly depicted in FIG. 7, which illustrates an integrated optical transceiver 80. The optical transceiver 80 comprises a light emitter 82 such as a laser or a light emitting diode, a beam forming lens 84 associated with the light emitter 82, the beam forming lens forming a divergent ray that may be transmitted toward a reflector, such as those previously described. The optical receiver of the integrated optical transceiver 80 comprises a focusing lens 86 circumferentially enclosing the beam forming lens 82 so that it is substantially aligned with the axis of the beam forming lens. As such, the optical receiver receives rays reflected along parallel paths from the reflectors that have reflected the light ray from the light emitter 82 and beam forming lens 84. The focusing lens defines a focal axis, f, and a focal point.

Along the focal axis, f, there is included an optical beam splitter, according to the embodiment of FIG. 7. In this example, the optical beam splitter comprises a half silvered mirror 88. As the half silvered mirror 88 splits the focused optical signal into two paths, two optical receiver devices may be used to provide image analysis of the received optical signal. In this embodiment, one optical signaling device comprises a charge coupled display 92 which is known to those of ordinary skill in the art to provide two-dimensional image processing for use by a processor. A second optical receiving device includes a photodiode and in this embodiment a PIN photodiode 90 which is known to those of ordinary skill in the art to be advantageous for precise switching. Accordingly, the PIN photodiode 90 may be advantageously used for determining receipt of the ranging signals. For example, as pulse width modulated optical signal is provided from the light emitter 82, then reflected by the retroreflector, and finally received by the photodiode 90, the switching of the photodiode 90 corresponds to the receipt of the optical signal and may be compared to the transmission from the light emitter 82 in order to determine a time delay of the optical signal.

Referring back to FIG. 1, the integrated optical transceiver of the present invention is advantageously interfaced with a processor 18. The processor 18, therefore, is capable of enabling light transmission from the light emitter 82 such as the light emitting diode or laser, and also for providing analysis of the two-dimensional image received by the charge coupled display 92 and for providing time domain analysis of the signals transmitted by the light emitter 82 and received by the photodiode 90.

Figure 8:
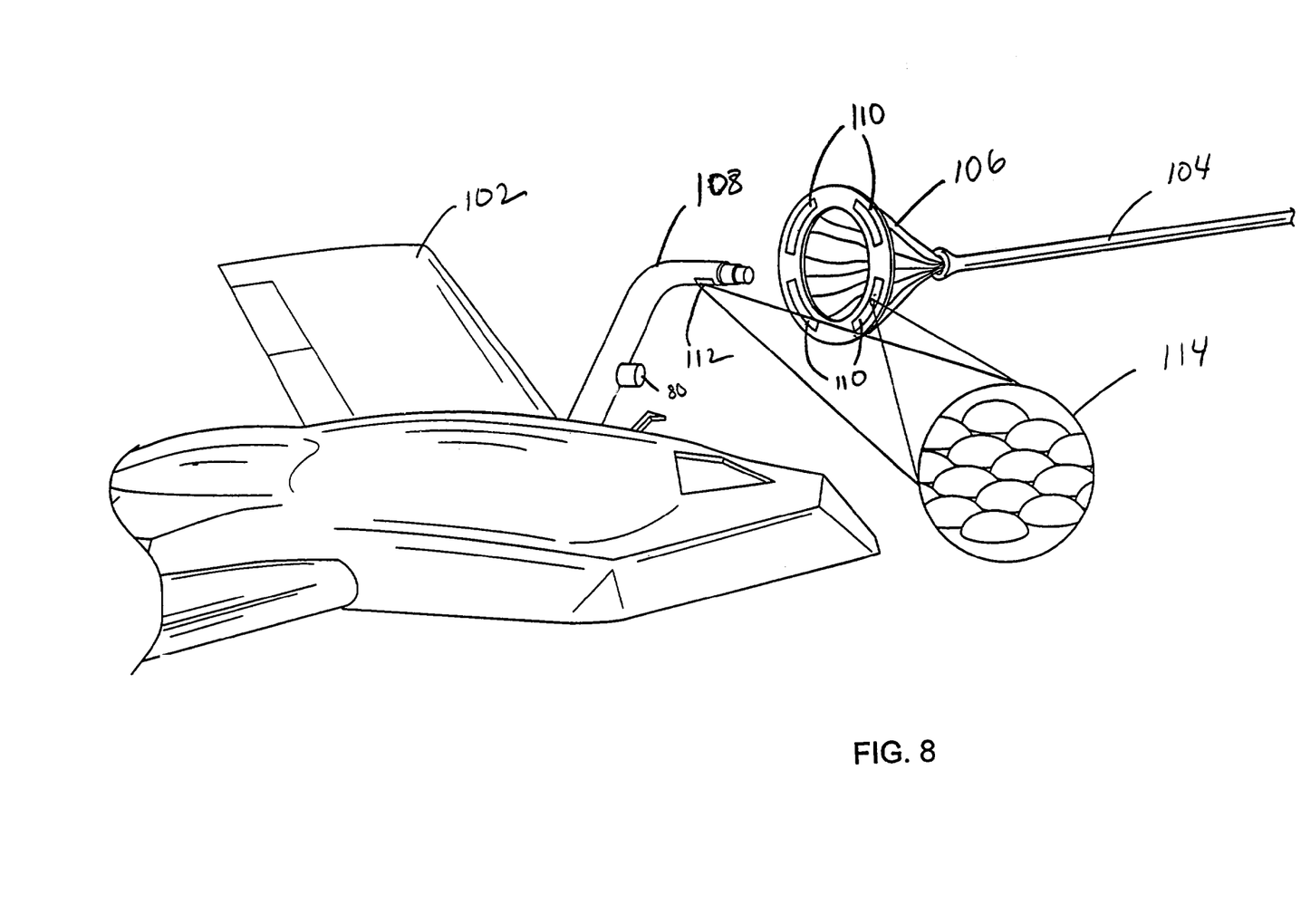
FIG. 8 is a perspective view of a probe and drogue refueling system including retroreflectors and an optical transceiver according to one embodiment of the present invention.

Referring now to FIG. 8, another advantageous embodiment of the present invention includes an optical transceiver 80 positioned on the unmanned air vehicle 102 for use in refueling systems such as probe and drogue refueling systems. In this embodiment, an optical transceiver 80 is disposed on an unmanned air vehicle 102 in a fixed relationship to a refueling probe 108 disposed on the aircraft. A refueling drogue 106 is trailed by a hose 104 from a refueling aircraft 120 (FIG. 9) for mating with the refueling probe 108. In this embodiment, however, rather than positioning the aircraft to within a refueling envelope (such as in the previously described embodiment of boom refueling systems), the aircraft flight system must position the refueling probe to within the refueling drogue itself. That is to say that there are no operations by any personnel on the refueling aircraft to position the refueling drogue 106 other than to trail the refueling drogue 106 behind the refueling aircraft. In many modern probe and drogue refueling systems, it is typically the responsibility of the aircraft pilot to position the refueling probe 108 to within the refueling drogue 106 in order to commence refueling operations. In the case of UAVs, however, this has not been effective due to the limited positioning abilities of remotely operated flight control systems on UAVs. Therefore, this advantageous embodiment of an optical system disposed on the unmanned air vehicle and retroreflectors disposed on the refueling drogue 106 permit optical positioning of the probe to within the refueling drogue.

More specifically, a first set of reflectors 110, and in this embodiment bead reflectors 114, are disposed in quadrants about the periphery of the refueling drogue, and a second set of reflectors 112, also in this embodiment bead reflectors 114, are disposed in a fixed relationship to the optical transceiver 80 and the refueling probe 108. Each set of reflectors 110, 112 are positioned such that an optical signal transmitted by the optical transceiver 80 may be reflected back to the transceiver by the reflectors for unitary processing by an imaging device, such as the charge coupled display.

Figure 9:
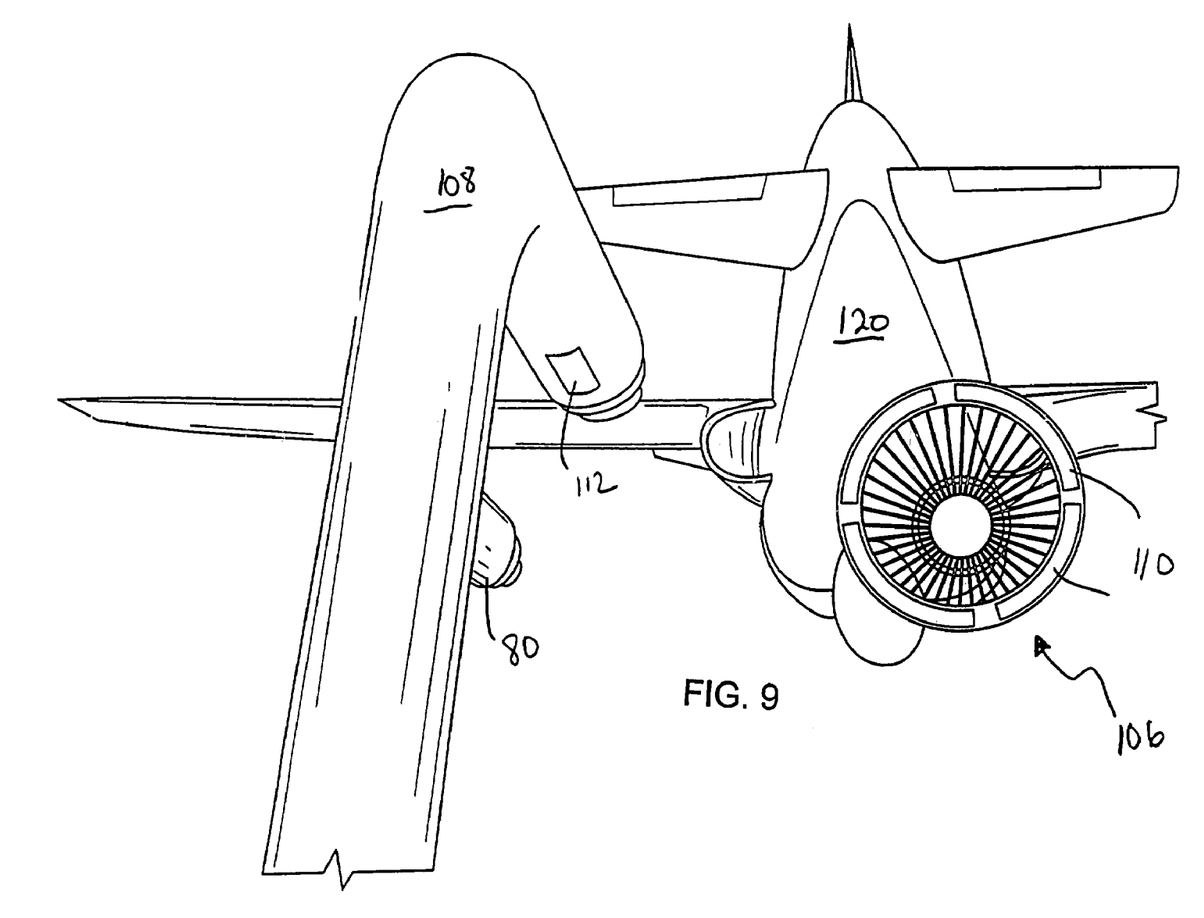
FIG. 9 is a perspective view of the reflectors from behind and optical transceiver disposed relative to a refueling probe according to one embodiment of the present invention.
Figure 10:
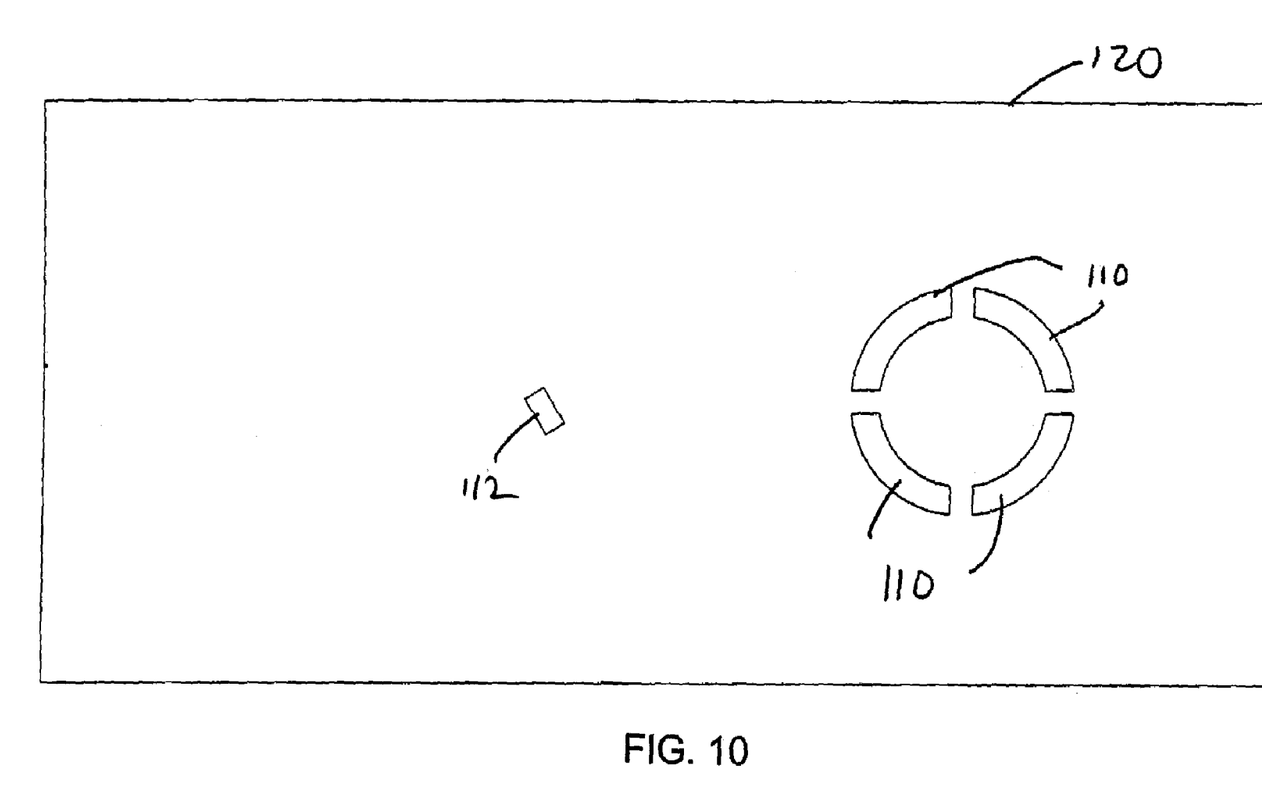
FIG. 10 is a two-dimensional image of the illumination of the reflectors illustrated in FIG. 9 according to one embodiment of the present invention.

Viewing the reflectors from behind the optical transceiver in FIG. 9, the optical transceiver 80 transmits an optical signal toward each reflector 110, 112 and, utilizing the charge coupled display 92, two-dimensionally images the bead reflector on the refueling probe in relationship to the bead reflector on the refueling drogue. FIG. 10 illustrates how this may appear within the field of view 120 of the display. As such, the two-dimensional image may be provided to the processor (such as in FIG. 1). Accordingly, the reflection from the reflectors provides two-dimensional spatial imaging permitting error or positioning signals to be provided by a processor to a flight control system for positioning the refueling probe to within the refueling drogue. To more clearly illustrate this principle in this example, the reflectors 110 on the refueling probe 108 are situated such that when the second reflector 112 on the refueling drogue 106 is aligned between the quadrants of first reflectors 110 the refueling probe is positioned to mate with the drogue. In FIGS. 9 and 10, the refueling probe reflectors are situated to the port of the refueling drogue and require starboard movement of the unmanned air vehicle 102 with respect to the refueling drogue 106. It should be noted that while this embodiment provides effective lateral positioning between the refueling probe and the unmanned air vehicle refueling probe by using alignment between reflectors, other lateral positioning reflectors that may or may not be aligned can be substituted so long as they permit two-dimensional positioning.

Accordingly, this optical system permits an advantageous method of positioning a first object relative to a second object such as a refueling aircraft 12 and an unmanned air vehicle 102. The method comprises transmitting an optical positioning signal from the unmanned air vehicle toward a first set of reflectors 110 on the refueling drogue 106. From the reflection, the optical receiver via the charge coupled display 92 and in communication with a processor, such as a computer, microprocessor, associated peripherals, and the like spatially identifies the first reflection of the optical positioning signal from the first reflector 110 on a refueling probe 106. Additionally, reflection from the refueling probe retroreflectors is also spatially identified. The spatial separation between the return illuminations from the first reflector 106 on the drogue and the second reflector 110 on the refueling probe 106 may be determined from the two-dimensional position on the charge coupled display 92 in communication with the processor. From the two-dimensional image, the computer may associate a position or error signal with the spatial separation, which may be provided to a flight control system on the unmanned air vehicle to laterally position the unmanned air vehicle 102 to within the desired position relative to the refueling drogue. This optical system may also incorporate optical ranging techniques by transmitting a ranging signal as previously described. Accordingly, the optical transceiver on the unmanned air vehicle transmits an optical signal toward the first reflectors 110 on the refueling drogue 106 and receives the reflected signal for determining the time delay, typically via the photodiode 90 in relationship to the light emitter 82 by the processor. The time delay from the transmitted and received signal, therefore, may be associated with a ranging signal to be provided to the flight control system in order to adjust range of the refueling probe 108 to within the refueling drogue 106.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A reflector, comprising:
    a peripheral retroreflector; and
    a central limit-angle incident retroreflector that limits reflection of light incident upon said central limit-angle incident retroreflector at an angle greater than a first limiting incident angle such that said central limit-angle incident retroreflector only reflects light that is incident thereupon from within a smaller range of angles than said peripheral retroreflector, the central limit-angle incident retroreflector being disposed in a predefined positional relationship to the peripheral retroreflector.

2. The reflector according to claim 1, wherein the central limit-angle incident retroreflector comprises a plurality of tube reflectors, each tube reflector comprising:
    at least one corner reflector;
    at least one tube defining a first length and width comprising a transparent bore and opaque sidewalls, the tube being disposed over the at least one corner reflector such that light passing axially through the bore reflects on the corner reflector.

3. The reflector according to claim 2, wherein the first length and width define a first ratio that defines the first limiting incident angle with respect to an axis of the bore, wherein light entering the bore at an angle greater than the first limiting incident angle is attenuated by the opaque sidewalls such that light does not reflect from the corner reflector.

4. The reflector according to claim 3, wherein the tube sidewalls comprise a cross section selected from the group consisting of circular, oval, ovoid, and polygonal.

5. The reflector according to claim 1, wherein the peripheral retroreflector comprises at least one corner reflector.

6. The reflector according to claim 1, wherein the peripheral retroreflector comprises a plurality of corner reflectors disposed about the central limit-angle incident retroreflector.

7. The reflector according to claim 6, wherein the predefined positional relationship comprises being disposed at the center of the plurality of corner reflectors.

8. The reflector according to claim 6, wherein the plurality of corner reflectors define a rectangular pattern about the central limit-angle incident retroreflector.

9. The reflector according to claim 1, further comprising at least one intermediate limit-angle incident retroreflector that limits reflection of light incident upon said intermediate limit-angle incident retroreflector at an angle greater than a second limiting incident angle, the intermediate limit-angle incident retroreflector being disposed between the peripheral retroreflector and the central limit-angle incident retroreflector.

10. The reflector according to claim 9, wherein the second limiting incident angle comprises an incident angle greater than the first incident limiting angle.

11. The reflector according to claim 9, wherein the at least one intermediate limit-angle incident retroreflector comprises a plurality of tube reflectors, each tube reflector comprising:
at least one corner reflector;
at least one tube defining a second length and width, and comprising a transparent bore and opaque sidewalls, the tube being disposed over the at least one corner reflector such that light passing axially through the bore reflects on the corner reflector.

12. The reflector according to claim 11, wherein second length and width define a second ratio that defines the second limiting incident angle with respect to an axis of the bore, wherein light entering the bore at an angle greater than the second limiting incident angle is attenuated by the opaque sidewalls such that light does not reflect from the corner reflector.

13. A reflector, comprising:
a first limit-angle incident retroreflector that limits reflection of light incident upon said first limit-angle incident retroreflector at an angle greater than a first limiting incident angle;
a second limit-angle incident retroreflector that limits reflection of light incident upon said second limit-angle incident retroreflector at an angle greater than a second limiting incident angle which is greater than the first limiting incident angle, the second limit-angle incident retroreflector being disposed in a predefined relationship to the first limit-angle incident retroreflector.

14. The reflector according to claim 1, wherein said peripheral retroreflector defines a predefined pattern, and wherein said central limit-angle incident retroreflector is positioned centrally within the predefined pattern defined by said peripheral retroreflector.

15. The reflector according to claim 13, wherein the first limit-angle incident retroreflector comprises a plurality of first tube reflectors, each tube reflector comprising at least one corner reflector;
a first tube defining a first length and width, and comprising a transparent bore and opaque sidewalls, the tube being disposed over the at least one corner reflector such that light passing axially through the bore reflects on the corner reflector.

16. The reflector according to claim 15, wherein the first length and width defines a first ratio that defines the first limiting incident angle with respect to an axis of the bore, wherein light entering the bore at an angle to greater than the first limiting incident angle is attenuated by the opaque sidewalls such that light does not reflect from the corner reflector.

17. The reflector according to claim 13, wherein the at least one second limit-angle incident retroreflector comprises a plurality of second tube reflectors, each tube reflector comprising
at least one corner reflector;
a second tube defining a second length and width, and comprising transparent bore and opaque sidewalls, the tube being disposed over the at least one corner reflector such that light passing axially through the bore reflects on the corner reflector.

18. The reflector according to claim 17, wherein the second length and width defines a second ratio that defines the second limiting incident angle with respect to an axis of the bore, wherein light entering the bore at an angle to greater than the second limiting incident angle is attenuated by the opaque sidewalls such that light does not reflect from the corner reflector.

19. The reflector according to claim 13, wherein the predefined relationship comprises the first incident angle retroreflector being disposed centrally between a plurality of second incident angle retroreflectors.

20. The reflector according to claim 13, further comprising a plurality of peripheral retroreflectors disposed around the first and second limit-angle incident retroreflectors.

21. An optical system comprising:
a first object;
a pattern of reflectors disposed on the first object comprising:
a peripheral retroreflector; and
a central limit-angle incident retroreflector that limits reflection of light incident upon said central limit-angle incident retroreflector at an angle greater than a first limiting incident angle such that said central limit-angle incident retroreflector only reflects light that is incident thereupon from within a smaller range of angles than said peripheral retroreflector, the central limit-angle incident retroreflector being disposed in a predefined positional relationship to the peripheral retroreflector;
a second object independent of the first object;
an optical transmitter positioned on the second object to transmit an optical signal toward the pattern of reflectors on the first object;
an optical receiver disposed on the second object and positioned to receive the optical signal reflected from the pattern of reflectors; and
a processor in communication with the optical transmitter and receiver and adapted to enable transmission of the optical signal from the transmitter, and to determine spatial characteristics of the reflected optical signal from the optical receiver.

22. The optical system according to claim 21, wherein the central limit-angle incident retroreflector comprises a plurality of tube reflectors, each tube reflector comprising:

at least one corner reflector;

at least one tube defining a first length and width, and comprising a transparent bore and opaque sidewalls, the tube being disposed over the at least one corner reflector such that light passing axially through the bore reflects on the corner reflector.

23. The optical system according to claim 22, wherein the first length and width define a first ratio that defines the first limiting incident angle with respect to an axis of the bore, wherein light entering the bore at an angle greater than the first limiting incident angle is attenuated by the opaque sidewalls such that light does not reflect from the corner reflector.

24. The optical system according to claim 21, wherein the pattern of reflectors further comprises at least one intermediate limit-angle incident retroreflector that limits reflections of light incident upon said intermediate limit-angle incident retroreflector at an angle greater than a second limiting incident angle disposed between the peripheral reflector and the peripheral reflector.

25. The optical system according to claim 24, wherein the at least one intermediate limit-angle incident retroreflector comprises a plurality of tube reflectors, each tube reflector comprising:

at least one corner reflector;

at least one tube defining a second length and width, and comprising a transparent bore and opaque sidewalls, the tube being disposed over the at least one corner reflector such that light passing axially through the bore reflects on the corner reflector.

26. The optical system according to claim 25, wherein the second length and width define a second ratio that defines the second limiting incident angle with respect to an axis of the bore, wherein light entering the bore at an angle greater than the second limiting incident angle is attenuated by the opaque sidewalls such that light does not reflect from the corner reflector.

27. The optical system according to claim 21, wherein the optical receiver comprises an imager.

28. The optical system according to claim 27, wherein the optical receiver further comprises an optical ranging receiver and the processor is further adapted to determine time delay between the transmitted optical signal and the optical signal received from the pattern of reflectors.

29. The optical system according to claim 21, wherein the first object comprises a first aircraft, and the second object comprises a second aircraft.

30. The optical system according to claim 29, further comprising the central limit-angle incident retroreflector being disposed on the first aircraft such that the first limiting incident angle defines a cone within which signals will be reflected.

31. The optical system according to claim 30, wherein the cone of position defines at least a portion of a refueling envelope and the processor is further adapted to provide an indication that the second aircraft is within at least a portion of the refueling envelope when receiving the optical signal reflected from the central limit-angle incident retroreflector.

32. The optical system according to claim 21, wherein said peripheral retroreflectors defines a predefined pattern, and wherein central limit-angle incident retroreflector is positioned centrally within the predefined pattern defined by said peripheral retroreflector.

* * * * *